United States Patent
Schwalenberg

(10) Patent No.: US 7,584,480 B1
(45) Date of Patent: Sep. 1, 2009

(54) METHOD OF MONITORING MULTIPLE COMPUTER SYSTEM CALLS USING ONE ROUTINE AND NON-EXECUTABLE CONFIGURATION FILE

(75) Inventor: David D. Schwalenberg, Baltimore, MD (US)

(73) Assignee: The United States of America as represented by the Director of the National Security Agency, Washington, DC (US)

( * ) Notice: Subject to any disclaimer, the term of this patent is extended or adjusted under 35 U.S.C. 154(b) by 956 days.

(21) Appl. No.: 11/190,208

(22) Filed: Jul. 22, 2005

(51) Int. Cl.
*G06F 3/00* (2006.01)
*G06F 12/00* (2006.01)
*G06F 9/45* (2006.01)

(52) U.S. Cl. ............... 719/328; 711/1; 717/154
(58) Field of Classification Search ............ 719/328; 711/1; 717/154
See application file for complete search history.

(56) References Cited

U.S. PATENT DOCUMENTS

| 5,812,852 A * | 9/1998 | Poulsen et al. ............ 717/149 |
| 6,134,603 A * | 10/2000 | Jones et al. ............... 719/330 |
| 6,735,774 B1 * | 5/2004 | Krishnaswamy ........... 719/328 |
| 2005/0066322 A1 | 3/2005 | Fink et al. |

* cited by examiner

*Primary Examiner*—Lechi Truong
(74) *Attorney, Agent, or Firm*—Robert D. Morelli

(57) ABSTRACT

A method of monitoring computer system calls by determining the system calls to be monitored. Then, determining data to be recorded for each system call. Then, creating a configuration file that includes the system calls and associated data. Then, modifying a system call table in a computer operating system to replace pointers to routines that correspond to system calls with pointers to a user-definable routine. If a system call occurs in a computer program then jumping to the user-definable routine, which reads the configuration file, jumps to a system call routine to execute the system call, returns to the user-definable routine with data produced by the system call routine, and records any returned data that is in the configuration file for that system call. Then, monitoring the computer program for other system calls.

3 Claims, 1 Drawing Sheet

US 7,584,480 B1

METHOD OF MONITORING MULTIPLE COMPUTER SYSTEM CALLS USING ONE ROUTINE AND NON-EXECUTABLE CONFIGURATION FILE

FIELD OF INVENTION

The present invention relates, in general, to electrical computers and digital processing systems and, in particular, to event notification.

BACKGROUND OF THE INVENTION

One method of monitoring the operation of a computer program (i.e., a computer process) is to monitor the branches or jumps from the program to one or more system calls. A system call is a routine that accomplishes a system-level (i.e., operating system) function on behalf of a computer process (e.g., memory allocation, accessing input or output devices). A system call is performed by the program being executed in order to execute a system-level routine. System calls are made by using a system call table in the computer's operating system. The routine that is called is responsible for returning control to the calling program after it has finished processing.

There are many different types of system calls. For example, the Windows NT/2000 operating system has system calls for System Information and Control (e.g., ZwQuerySystemInformation), Objects (e.g., ZwQueryObject), Virtual Memory (e.g., ZwAllocateVirtualMemory), Sections (e.g., ZwCreateSection), Threads (e.g., ZwSuspendThread), Processes (e.g., ZwTerminateProcess), Jobs (e.g., ZwAssignProcessToJobObject), Tokens (e.g., ZwDuplicateToken), Synchronization (e.g., ZwSetEvent), Time (e.g., ZwQueryPerformanceCounter), Execution Profile (e.g., ZwStartProfile), Ports (e.g., ZwConnectPort), Files (e.g., ZwReadFile), Registry Keys (e.g., ZwLoadKey), Security and Auditing (e.g., ZwAccessCheck), Power Management (e.g., ZwGetDevicePowerState), and Miscellany (e.g., ZwLoadDriver). Each system call has a routine associated with it that could require certain input data and produce certain output data.

The prior art method of monitoring system calls is to modify a system call table in a computer operating system so that each pointer in the table that would otherwise cause that the program that does a system call to jump to the corresponding system call routine would cause the program to jump to another unique routine. Each unique routine would call its corresponding system call routine. The system call routine would execute as requested and return information to the unique routine that called it. The unique routine could then record whatever information about the system call that is possible. The unique routine would then return the output of the system call routine to the program so that the program could continue. To the program, it looks like it called a system call routine and received the result. However, the unique routine monitored the system call. A different custom routine is required for each system call, because each system call could require different parameters as input and produce different outputs. Skilled computer scientists are needed to write such routines, and every time a routine is added to a program, the program must be recompiled. Such tasks are prone to error and are expensive.

U.S. Pat. No. 6,735,774, entitled "METHOD AND APPARATUS FOR SYSTEM CALL MANAGEMENT," discloses a device for and a method of managing system call that is in accordance with the prior art method described above. The present invention does not manage system calls as does U.S. Pat. No. 6,735,774, and U.S. Pat. No. 6,735,744 does not disclose the method of the present invention. U.S. Pat. No. 6,735,774 is hereby incorporated by reference into the specification of the present invention.

U.S. Pat. Appl. No. 20050066322 A1, filed on Sep. 18, 2003 now U.S. Pat. No. 7,412,694 entitled "METHOD FOR DETECTING PROGRAM PHASES WITH PERIODIC CALL-STACK SAMPLING," discloses a method of monitoring system calls by counting the number of stack frames that are created in response to system calls. The present invention does not monitor system calls by counting stack frames created in response to system calls as does U.S. Pat. Appl. No. 20050066322 A1. Now U.S. Pat. No. 7,412,694 U.S. Pat. Appl. No. 20050066322 A1 is hereby incorporated by reference into the specification of the present invention.

There is a need for a method of monitoring systems calls that does not require unique routines for each system call to be monitored, specialized computer science skills, and recompiling with every addition or deletion of a system call to be monitored. The present method satisfies this need.

SUMMARY OF THE INVENTION

It is an object of the present invention to monitor system calls done by a computer program.

It is another object of the present invention to monitor system calls done by a computer program without requiring unique routines for each system call to be monitored.

It is another object of the present invention to monitor system calls done by a computer program without requiring recompilation with every addition or deletion of a system call to be monitored.

The present invention is a method of monitoring multiple computer system calls using one routine and a non-executable configuration file that does not require recompilations when additions or deletions are made to the system called to be monitored.

The first step of the method is determining a user-definable number of system calls to be monitored.

The second step of the method is determining data to be recorded for each system call determined in the first step.

The third step of the method is creating a non-executable configuration file that includes the system calls and associated data determined in the first step and the second step, respectively.

The fourth step of the method is modifying a system call table in a computer operating system to replace pointers to routines that correspond to system calls determined in the first step with pointers to a user-definable routine.

If a system calls determined in the first step occurs during the execution of a computer program then the fifth step of the method is jumping to and executing the user-definable routine to which the system call table points, where the user-definable routine is comprised of the following steps.

The first substep of the fifth step is reading the non-executable configuration file to determine what data to record for the system call that occurred.

The second substep of the fifth step is jumping to a system call routine to execute the system call that occurred.

The third substep of the fifth step is returning from the system call routine to the user-definable routine with data produced by the system call routine.

The fourth substep of the fifth step is recording the data returned from the system call routine that is included in the non-executable configuration file for the system call.

The sixth, and last, step of the method is returning to the fifth step to monitor other system calls.

DETAILED DESCRIPTION

Figure 1:
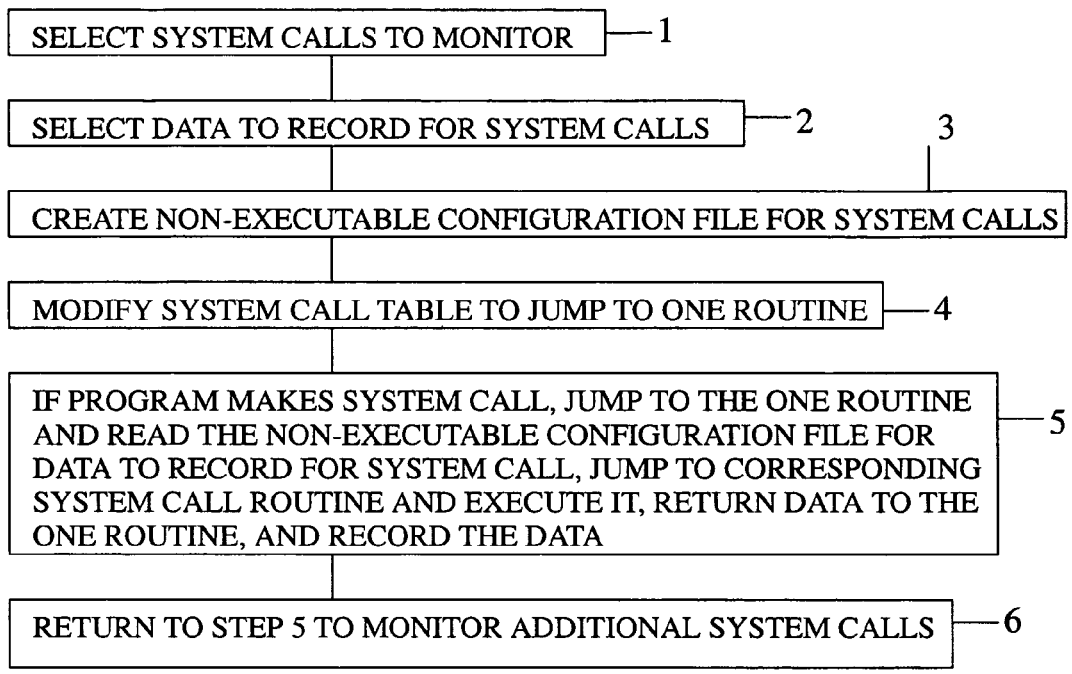
FIG. 1 is a flowchart of the steps of the present invention.

The present invention is a method of monitoring multiple computer system calls using one routine and a non-executable configuration file that is not recompiled if any additions or deletions are made to the systems calls to be monitored.

FIG. 1 is a flowchart of the method of the present invention.

The first step 1 of the method is determining a user-definable number of system call types to be monitored. In the preferred embodiment, the system calls monitored are system calls in a Microsoft Windows operating system (e.g., Windows 2000, Windows XP). However, the present invention applies to system calls from any operating system.

The second step 2 of the method is determining data to be recorded for each system call type determined in the first step 1. The complete set of data from which a user may choose includes all input data to and/or output data from the system call routines determined in the first step 1.

The third step 3 of the method is creating a non-executable configuration file that includes the system call types and associated data determined in the first step 1 and the second step 2, respectively. In the preferred embodiment, the non-executable configuration file is a file written in Extensible Markup Language (XML). However, any other suitable non-executable configuration file may be used. Such a file may be modified to add or delete system calls to be monitored without the need to recompile the file. No specialized computer science skills are required to make such modifications.

The fourth step 4 of the method is modifying a system call table in a computer operating system to replace pointers to routines that correspond to system calls determined in the first step 1 with pointers to a user-definable routine.

If a system call type determined in the first step 1 occurs during the execution of a computer program then the fifth step 5 of the method is jumping to and executing the user-definable routine.

The steps required to accomplish the fifth step 5 above are as follows. The first substep 5a of the fifth step 5 is reading the non-executable configuration file to determine what data to record for the system call type that occurred. In the preferred method, the non-executable configuration file is an XML file. However, any other non-executable configuration file will do.

The second substep 5b of the fifth step 5 is jumping to a system call routine to execute the system call that occurred.

The third substep 5c of the fifth step 5 is returning from the system call routine to the user-definable routine with data produced by the system call routine.

The fourth substep 5d of the fifth step 5 is recording the data returned from the system call routine that is included in the non-executable configuration file for the system call. In the preferred method, the data is recorded into the computer's memory. However, any other sufficient storage medium will do.

The sixth, and last, step of the method is returning to the fifth step 5 to monitor for other system calls.

In an alternate embodiment, the data recorded in the fourth substep 5d of the fifth step 5 is reported. Any suitable reporting method will do.

What is claimed is:

1. A method of monitoring multiple computer system calls using one user-definable routine and non-executable configuration file, comprising steps of:
   a) determining on a computer a user-definable number of system calls to be monitored so that a user may select which system call to monitor, wherein each system call of the system calls produces data that is particular to the each system call;
   b) determining the data produced by the each system call of the system calls to be recorded for the each system call determined in step (a);
   c) creating a non-executable configuration file that includes system call types and associated data of the data determined in step (a) and step (b), respectively, wherein the non-executable configuration file is written in Extensible Markup Language that includes the system calls and the associated data determined in step (a) and step (b), respectively;
   d) modifying a system call table in a computer operating system to replace pointers to system call routines that correspond to the system calls determined in step (a) with pointers to the one user-definable routine;
   e) if a system call type of the system call types determined in step (a) occurs during an execution of a computer program then jumping to and executing the one user-definable routine, wherein the one user-definable routine is comprised of the following steps:
      a. reading the non-executable configuration file to determine what data from the associated data to record for the system call type that occurred;
      b. jumping to a system call routine corresponding to a system call to execute the system call for the system call type that occurred;
      c. returning from the system call routine to the one user-definable routine with data produced by the system call routine;
      d. recording the data returned from the system call routine that is included in the non-executable configuration file for the system call type; and
   f) returning to the step (e), wherein the step of reading the non-executable configuration file to determine what the data to record for the system call type that occurred is comprised of a step of reading the non-executable configuration file written in the Extensible Markup Language to determine what the data to record for the system call type that occurred, wherein the step of recording the data returned from the system call routine that is included in the non-executable configuration file for the system call type is comprised of a step of recording the data returned from the system call routine that is included in the non-executable configuration file for the system call.

2. The method of claim 1, further including a step of reporting the data recorded.

3. The method of claim 2, further including a step of modifying the non-executable configuration file to include additional system call types and associated data.

* * * * *